Figure 3:
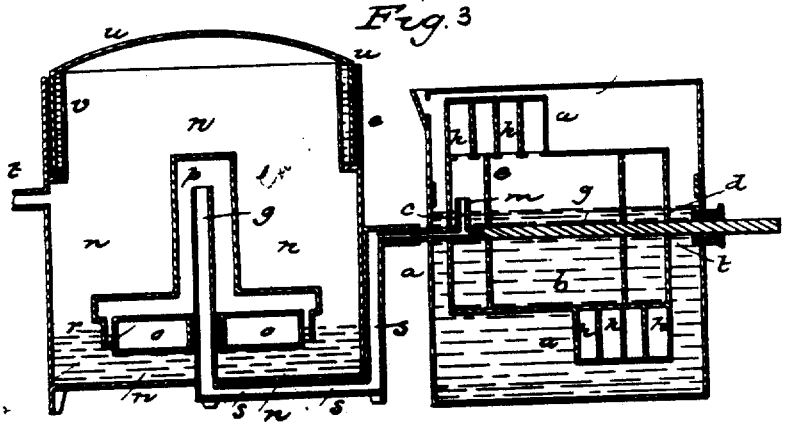

BEST AVAILABLE COPY

G. ODIORNE.

Apparatus for Carbureting Air.

No. 2,253. Reissued May 22, 1866.

WITNESSES
Chas. E. Bailey
Geo. Hoffmann

INVENTOR
Geo. Odiorne
by his atty
Joseph Garrett

N. PETERS, Photo-Lithographer, Washington, D.C.

BEST AVAILABLE COPY

UNITED STATES PATENT OFFICE.

GEORGE ODIORNE, OF BOSTON, MASSACHUSETTS.

IMPROVED APPARATUS FOR CARBURETING AIR.

Specification forming part of Letters Patent No. 44,883, dated November 1, 1864; Reissue No. 2,253, dated May 22, 1866.

*To all whom it may concern:*

Be it known that I, GEORGE ODIORNE, of Boston, in the county of Suffolk and State of Massachusetts, have invented certain new and useful Improvements in Apparatus for Making Gas from Liquid Hydrocarbons; and I do hereby declare that the following description, taken in connection with the accompanying plate of drawings, hereinafter referred to, forms a full and exact specification of the same, wherein I have set forth the nature and principles of my improvements, by which my invention may be distinguished from all others of a similar class, together with such parts as I claim and desire to have secured to me by Letters Patent.

In the production of illuminating gas from volatile hydrocarbons the process consists simply in impregnating atmospheric air with the vapor of the hydrocarbon liquid.

The success of this operation depends, first, upon applying a constant and uniform current of air to the apparatus; and, second, upon causing the air to take up a fixed and stated amount of hydrocarbon vapor under all circumstances. Thus, for instance, if the pressure of air in the apparatus is not uniform at all times, it will pass with unequal velocities through or over the liquid, and change the temperature of the latter accordingly; and, again, the air will be changed more or less with the hydrocarbon liquid, according to the length of time it occupies in passing through the same, thus rendering the gas heavier or lighter, as the case may be, and, of course, affecting the lights in the same degree.

One of the principal difficulties heretofore experienced in making illuminating gas by depending upon the evaporation of liquid hydrocarbon has arisen from the fact that the quantity of gas required for the minimum and maximum number of burners had to be furnished by the supplying of greater or less quantities of air, and thus, while the gas for a small number of lights would be too highly charged with carbon, the gas produced for a large number of burners would not be sufficiently rich in illuminating qualities, because, in the latter case, the air could not become saturated to the requisite degree.

The objects of the present invention are then, first, to pass through the apparatus a constant and uniform current of atmospheric air; and, second, to insure the saturation of this air with a fixed and stated amount of hydrocarbon vapor, whatever may be the consumption of the gas—that is, so that the relative proportions of atmospheric air and carbon contained in the gas shall remain the same under all circumstances.

The most essential features of my improved apparatus consists of a peculiar construction and arrangement of the device employed for forcing the air through the apparatus and a self-regulating float resting in the liquid hydrocarbon, and maintained therein at a uniform depth at all times, through which float and stratum of liquid hydrocarbon the air is made to pass into the gas-reservoir.

Figure 2:
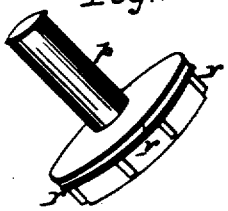
Figure 1:
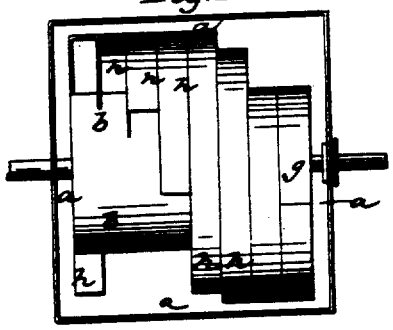

My improvements are represented in the accompanying plate of drawings, of which Figure 1 is a plan or top view of the air-forcing apparatus; Fig. 3, a perspective view of the float; Fig. 2, a transverse vertical section of the whole apparatus, and Fig. 4 a transverse vertical section of the air-forcing device.

Figure 4:
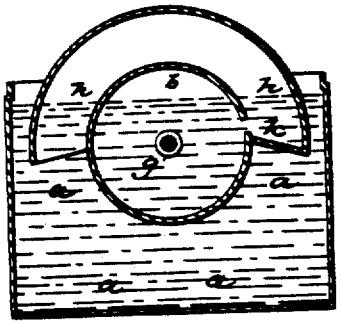

In the accompanying drawings, *a a a* represent a vessel of any suitable form, partially filled with water, as shown in Figs. 3 and 4. Within the vessel *a a a* is the air-forcing apparatus, consisting of a hollow drum, *b b*, into which the water enters at *c* and *d*, Fig. 3. The drum *b b* is attached by means of perforated plates *e* and *f* to a shaft, *g*, made to revolve by means of a weight or in any other suitable manner.

*h h*, &c., are a serious of sector-shaped chambers or buckets arranged upon the periphery of the drum *b b*, as shown in the drawings. Each of these buckets or chambers is open at one end and closed at the other, and communicate with the interior of the drum *b b* by an opening, *i*, near its closed end *k*.

The drum-shaft *g*, before referred to, has a bearing at one end in the side of the vessel *a a a*, &c., at the other end in the head of a tube, *l*, which has a pipe, *m*, projecting upward from and communicating with it. The pipe *m* extends above the level of the water in the vessel *a a a*.

The gasometer or vessel containing the liquid hydrocarbon and gas is separate from but connected with the vessel *a a a*, as will be hereinafter explained, and is represented at *n n n*, Fig. 3. Within the gasometer *n n n*, and rest-

BEST AVAILABLE COPY ing upon the hydrocarbon liquid so as to be slightly immersed therein, is a traveling hollow float, *o p*, guided in its up-and-down motion by a hollow shaft, *q*. Around the closed base *o* of the float are a series of short tubes, *r r*, &c., communicating with the upper portion, *p*, thereof, and with their lower ends opening into the hydrocarbon liquid. The connection between the gasometer *n n n* and the vessel *a a a* is made by means of the right-angular tube or passage *s s*, which communicates both with the hollow shaft *q* and the tube *l*, before referred to.

The operation of the apparatus is as follows: The drum *b b* being revolved, the open ends of the buckets or chambers *h h*, &c., necessarily dip into and pass through the water in the vessel *a a a*, thereby forcing through their openings *i i* air into the drum *b b*, the space above the level of the water thus becoming a reservoir of compressed air, which is delivered through the pipe *m* into the tube *l*. The perforated plates *e* and *f* serve, it will be observed, both to connect the drum *b b* with its shaft *g* and to allow the free passage of the air and water through them. By the peculiar construction and operation of the above-described device for passing the air through the apparatus, it will be seen that the desired effect will be produced, not only with much less friction than by an ordinary center drum, or other devices heretofore used for the purpose, but the supply of air, instead of being intermittent, as has heretofore necessarily been the case, is continuous and uniform, the buckets or chambers operating one after the other in and upon the water in the vessel *a a a*, instead of encountering the whole resistance of the water in a body, so as to furnish a steady supply of air to the drum *b b*. The air being forced into the tube *l*, as hereinbefore described, passes through the right-angular passage *s s*, up through the vertical hollow shaft *q*, down through the upright portion of the float *o p*, through the short tubes *r r*, &c., and into the hydrocarbon liquid, from which it emerges, charged with the vapor of the same, into the gasometer *n n n*, whence it can be delivered, as desired, through an opening, *t*.

It will be evident that the float *o p* can have its weight so regulated as to cause its short tubes *r r*, &c., to be immersed any desired depth in the hydrocarbon liquid, and according as this depth is greater or less will the quantity of carbon taken up by the air be varied, because the longer the air is in passing through the liquid, or, what is the same thing, the greater the depth of the stratum of the liquid through which the air has to pass the richer will be the gas formed, so that when the extent to which the short tubes *r r*, &c., shall be immersed in the hydrocarbon liquid is once determined and regulated the relative proportions of air and carbon contained in the gas produced must always remain the same, whether the amount consumed be varied or not.

Placed over the gasometer is a cap, *u u*, the sides of which play up and down in an annular chamber, *v v*, formed in the top of the gasometer, and sealed with any suitable hydraulic joint. The extent to which it shall rise can be regulated by springs or otherwise, and its operation and purpose will be readily understood without further explanation.

Having thus described my improvements, I shall state my claims as follows:

I do not claim the enriching of gas by passing it through or over liquid hydrocarbons; but What I do claim as my invention, and desire to have secured to me by Letters Patent, is—

1. So constructing and arranging a float in connection with a suitable air-forcing apparatus as to invariably cause the air to be forced through the liquid hydrocarbon in the manner herein described—that is to say, by dividing the volume of air into uniform streams which shall flow from or escape through apertures at the periphery of the float, as set forth.

2. The air-forcing apparatus herein described, the same consisting of a hollow drum having a series of buckets or chambers arranged upon the periphery of the same and communicating with the interior thereof, all as specified.

3. The combination of the air-forcing apparatus and float, arranged and operating with regard to each other as described.

GEO. ODIORNE.

Witnesses:
GEORGE W. MANN,
SAML. M. BARTON.